US007633839B2

(12) United States Patent
Hanks (10) Patent No.: US 7,633,839 B2
(45) Date of Patent: Dec. 15, 2009

(54) SELF-SENSING ACTIVE-DAMPING VOICE COIL

(75) Inventor: Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 869 days.

(21) Appl. No.: 10/923,524

(22) Filed: Aug. 20, 2004

(65) Prior Publication Data

US 2006/0039267 A1    Feb. 23, 2006

(51) Int. Cl.
*G11B 7/00* (2006.01)
(52) U.S. Cl. .................. 369/44.29; 369/44.32
(58) Field of Classification Search ........................ None
See application file for complete search history.

(56) References Cited

U.S. PATENT DOCUMENTS

| | | | |
|---|---|---|---|
| 4,914,725 A | | 4/1990 | Belser et al. |
| 5,296,790 A | * | 3/1994 | Fincher ....................... 318/560 |
| 5,299,075 A | | 3/1994 | Hanks |
| 5,447,051 A | | 9/1995 | Hanks et al. |
| 5,449,986 A | * | 9/1995 | Dozor ................... 318/400.14 |
| 5,548,192 A | | 8/1996 | Hanks |
| 5,550,685 A | | 8/1996 | Drouin |
| 6,222,336 B1 | * | 4/2001 | McKenzie et al. ........... 318/448 |
| 6,538,966 B1 | | 3/2003 | Hanks |
| 6,570,360 B1 | * | 5/2003 | Freeman ..................... 318/798 |
| 6,646,410 B2 | | 11/2003 | Rich et al. |
| 6,674,705 B1 | | 1/2004 | Hanks |
| 6,690,534 B2 | | 2/2004 | Ding et al. |
| 6,693,764 B1 | | 2/2004 | Sheh et al. |
| 6,721,260 B2 | | 4/2004 | Hanks |
| 6,741,529 B1 | * | 5/2004 | Getreuer ................... 369/30.17 |
| 6,795,268 B1 | * | 9/2004 | Ryan ........................ 360/78.04 |
| 2001/0017827 A1 | * | 8/2001 | Chu ......................... 369/44.35 |
| 2002/0001153 A1 | * | 1/2002 | Maiocchi .................. 360/73.03 |
| 2004/0080860 A1 | * | 4/2004 | Inaji et al. ................ 360/77.02 |
| 2004/0240101 A1 | * | 12/2004 | Inaji et al. ................ 360/77.02 |

FOREIGN PATENT DOCUMENTS

| | | |
|---|---|---|
| EP | 0 559 397 A | 9/1993 |
| EP | 0 568 768 A | 11/1993 |
| EP | 0 572 789 A | 12/1993 |

(Continued)

OTHER PUBLICATIONS

Yamaguchi et al, "Recent Control Technologies for Fast and Precise Servo System of Hard Disk Drives", 2000 IEEE, pp. 69-73.

(Continued)

*Primary Examiner*—Wayne R Young
*Assistant Examiner*—Lixi Chow (57) ABSTRACT

A control circuit creates a self-sensing active-damping voice coil. The control circuit includes a current sensor coupled to a voice coil. A first filter is coupled to the current sensor to create an error voltage that is proportional to the integral of an external acceleration applied to the voice coil. A second filter with a lead-lag component is coupled to the error voltage to create a voltage applied to the voice coil that substantially cancels the external acceleration below a pole defined by a lead-lag component thereby damping the external accelerations.

32 Claims, 8 Drawing Sheets

FOREIGN PATENT DOCUMENTS

JP          63-070933 A     3/1988

OTHER PUBLICATIONS

W. Marshall Leach, "Loudspeaker Voice-Coil Inductance Losses: Circuit Models, Parameter Estimation, and Effect on Frequency Response", Jrnl of the Audio Engineering Society, V. 50(6), Jun. 2002, pp. 442-449.

D.J. Leo et al, "A Self-Sensing Technique for Active Acoustic Attenuation", Jrnl of Sound and Vibration, (2000( 235(5), 863-873.

Jon Pratt et al, "Development and Analysis of a Self-Sensing Magnetostrictive Actuator Design", SPIE/ASME/SEM North American Conference on Smart Structures, Feb. 1993.

* cited by examiner

Self-sensing active-damping voice coil

Fig. 9

SELF-SENSING ACTIVE-DAMPING VOICE COIL

BACKGROUND

Voice coil actuators are used in many systems, such as magnetic and optical disc drives. The voice coil actuators are using with open or closed-loop tracking systems. Close loop systems such as with optical data drives and hard discs use data read from the surface of the disc as feedback within the closed loop to ensure position or make necessary corrections. Open loop tracking systems using voice coil actuators such as in floppy drives or optical labeling drives must 'dead-reckon' and have significant sensitivity to shock and vibration.

Most actuators use only their spring tethering to maintain their position in the presence of shock and vibration. In optical drives, such as CD audio players, large buffers of data are used to continue to play music during shock events until the tracking system can recover. In drives that write data, such shock and vibration causes a significant displacement of the actuator that may show up as corrupted data when later read or as visual artifacts if one uses the actuator to label a surface. Therefore, there is a need for a control system that is able to minimize motion of the actuator in the presence of shocks and vibrations.

BRIEF DESCRIPTION OF THE DRAWINGS

One can better understand the invention with reference to the following drawings. The elements of the drawings are not necessarily to scale relative to each other. Rather, emphasis has instead been placed upon clearly illustrating the invention. Furthermore, like reference numerals designate corresponding similar parts through the several views.

DETAILED DESCRIPTION

The following is a detailed description of the best presently known modes of carrying out the inventions. This description is not to be taken in a limiting sense, but is made merely for illustrating the general principles of the invention. It is noted that detailed discussions of optical drive and projection systems components that are not pertinent to the present invention have been omitted for the sake of simplicity. The present invention is also applicable to a wide range of technologies, including those presently being developed or yet to be developed. For example, although optical drives are shown and illustrated, other drives such as magnetic, capacitive, mechanical, and electrostatic having voice coil actuators are equally applicable to the present invention. Further, the invention is applicable to actuators used in control systems other than that found in memory drives.

It should be noted that the drawings are not true to scale. Further, various parts of the elements have not been drawn to scale. Certain dimensions have been exaggerated in relation to other dimensions in order to provide a clearer illustration and understanding of the present invention.

In addition, although some of the embodiments illustrated herein are shown in two-dimensional views with various regions having length and width, it should be clearly understood that these regions are illustrations of only a cross-sectional portion of a device that is actually a three-dimensional structure. Accordingly, these regions will have three dimensions, including length, width, and depth, when fabricated as an actual device. Moreover, while the present invention is illustrated by embodiments directed to optical drives and projector devices, it is not intended that these illustrations be a limitation on the scope or applicability of the present invention. It is not intended that the optical drive or projector devices of the present invention be limited to the physical structures illustrated. These structures are included to demonstrate the utility and application of the present invention to presently preferred and alternative embodiments.

Actuators in modern drives, such as optical and hard discs (i.e. magnetic), use a device called a 'voice coil' to move the head arms in and out over the surface of the discs. The name 'voice coil' comes from the resemblance of this technology to that used to drive audio speakers, both of which are electromagnets. A closed-loop feedback system, also known as a 'servo system,' is used with the voice coil to dynamically position the heads of disc drives directly over the data tracks or otherwise position the heads with respect to a radial and/or focal position on the drive surface. The voice coil works using electromagnetic attraction and repulsion and is known in some embodiments as a 'solenoid'. In one embodiment of a voice coil, a coil is wrapped around a metal protrusion on the end of the set of head arms. This sub-assembly is mounted within an assembly containing a strong permanent magnet. When current is supplied to the coil, an electromagnetic field is generated that causes the heads to move in one direction or the other based on attraction or repulsion relative to the permanent magnet. By controlling the current, the heads can be told to move in or out much more precisely than using a stepper motor. Hard disc voice coil actuators are rotary, meaning that the actuator changes position by rotating on an axis. Other drives may implement linear voice coils meaning that the actuator changes position by moving back and forth in one direction. Optical drives also use linear voice-coil actuators to position a laser with respect to the disc surface to perform a focusing fiction.

Figure 1:
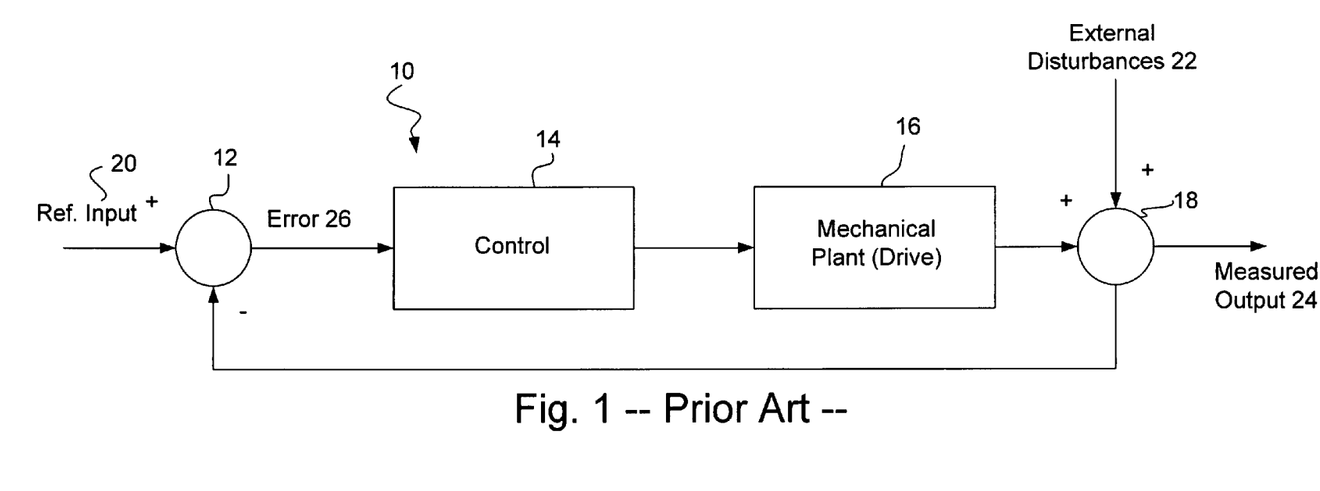
FIG. 1 is a block diagram of a conventional feedback control circuit.

FIG. 1 is an exemplary block diagram of a conventional control system 10 having a reference input 20, a control circuit 14, and a mechanical plant 16 (such as the voice coil actuator drive). The mechanical plant 16 is subject to external disturbances 22 that are shown as summed together in sum unit 18 to create a measured output 24. This measured output 24 is subtracted from the reference input 20 in the difference unit 12 to create an error signal 26. The control circuit 14 uses this error signal 26 to make appropriate adjustments to the mechanical plant 16 and to compensate for the external disturbances 22. Generally, accelerometers or other devices sense the measured output by monitoring the mechanical plants movement and create a signal to be subtracted from the reference input 20. The use of special sensors such as accelerometers, their cost, and the delicate calibration required has limited the use of this approach except for highly specialized systems.

Figure 2:
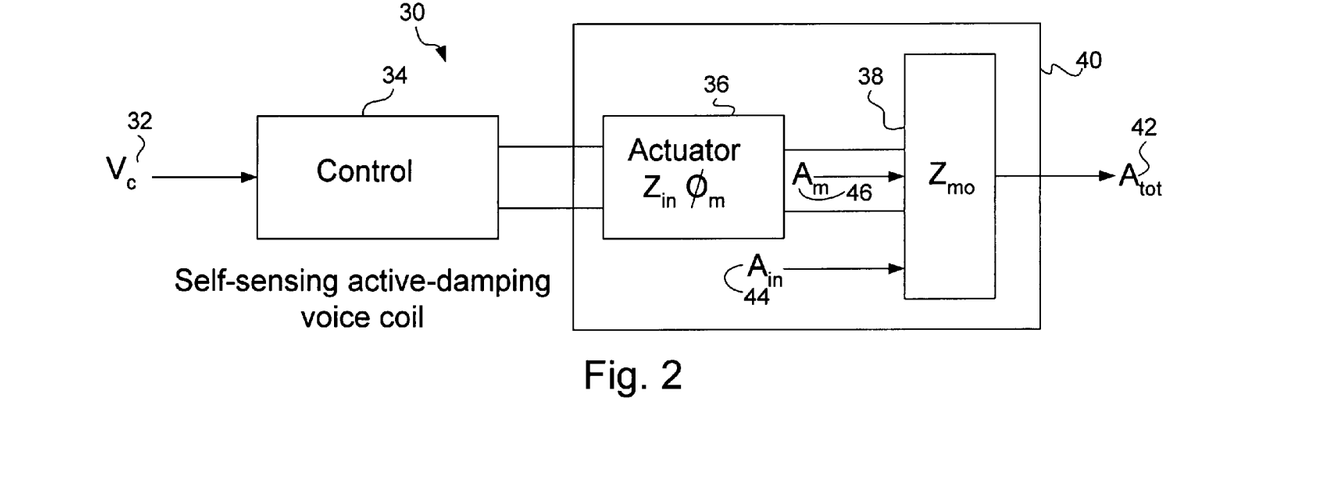
FIG. 2 is a block diagram of an embodiment of the invention.

FIG. 2 is an exemplary block diagram of an embodiment of a control system 30 that includes a control circuit 34 and a mechanical plant 40 which create a self-sensing active-damping voice coil actuator system that is resistant to external disturbances such as shock and vibration. In this circuit, a reference input $V_c$ 32 is supplied into the control circuit 34 that drives an actuator 36. The actuator 36 has a characteristic electrical impedance $Z_{in}$ and magnetic flux $\emptyset_m$. The actuator 36 is generally attached to other devices in the mechanical plant 40 and thus includes mechanical impedance 38, $Z_{mo}$, such as friction being but one example. The mechanical impedance 38 is subjected to acceleration $A_m$ by the actuator 36 and to external disturbances that cause an external acceleration $A_{in}$ on the mechanical impedance of actuator 36. Together a total acceleration 42, $A_{tot}$ is applied to the mechanical plant 40. The invention allows the control circuit 34 to use the actuator 36 as a self-sensor by using the back-emf generated by the actuator 36 when the magnetic flux $\emptyset_m$ is traversed by the actuator itself. Any external forces applied to the actuator will also cause a change in movement of the actuator 36 in the magnetic flux $\emptyset_m$ thus causing a change in current through the actuator 36 that the control circuit 34 can sense and compensate for accordingly.

Figure 3:
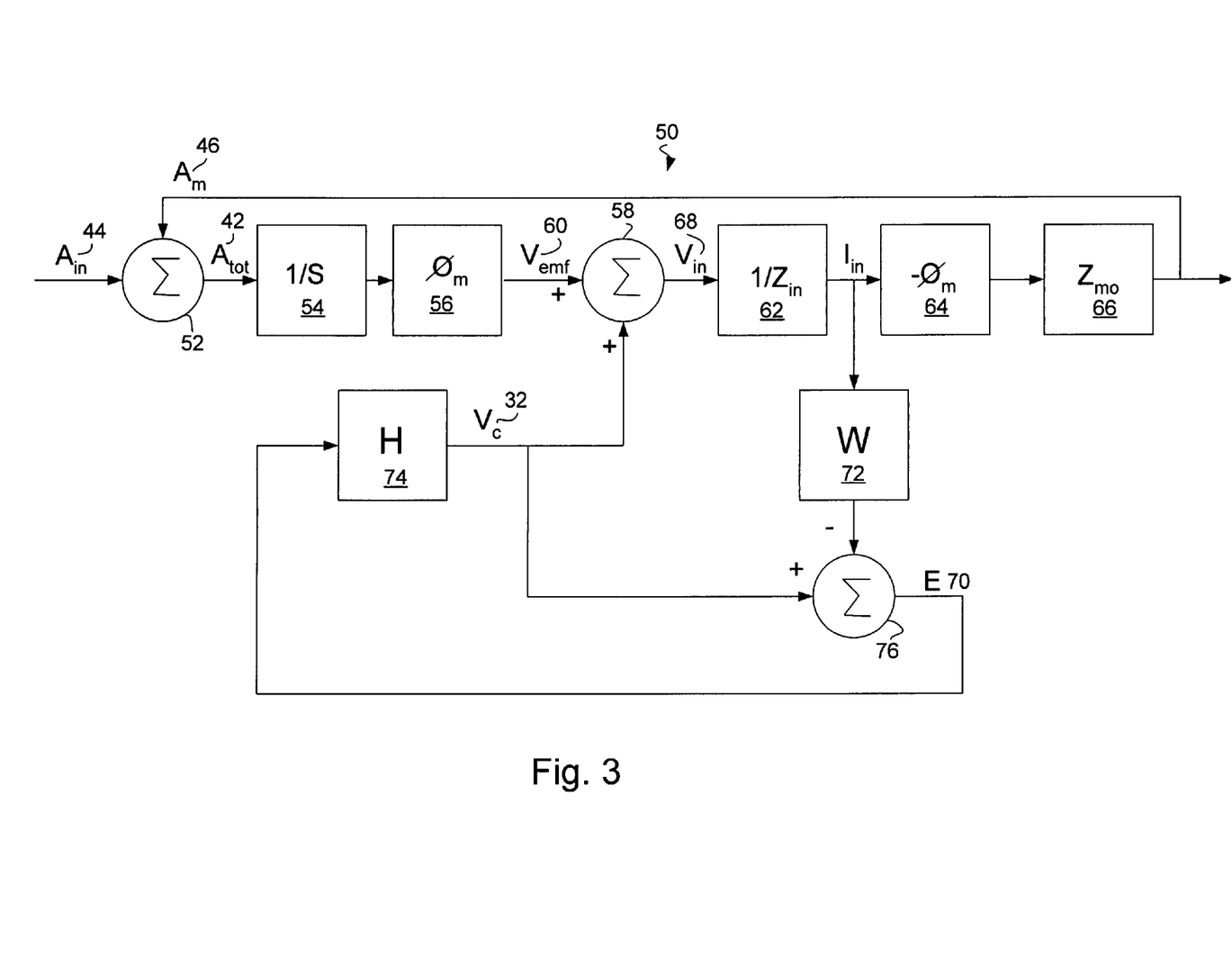
FIG. 3 is a block control diagram of an exemplary embodiment of the invention.

FIG. 3 is a block diagram of a control circuit 50 of one embodiment of the control system shown in FIG. 2 that implements a self-sensing active-damping voice coil. This re-arranged diagram shows the external acceleration 44 $A_{in}$ as an input with the desired acceleration 46 $A_m$ as the output. The desired goal of the control system is to make the desired acceleration 46 $A_m$ insensitive to $A_{in}$.

The voice coil actuator is modeled as a series of linear blocks connected together. External accelerations $A_{in}$ 44 can be injected into the system as can external voltages 32 $V_c$. The output of interest in this system is the self-acceleration of the actuator 42, $A_{tot}$ that is desired to be zeroed or minimized when only just subjected to external acceleration $A_{in}$ 44. In the block diagram, back-emf 60, $V_{emf}$ results from the velocity of the actuator ($A_{tot}/s$ after block 54) moving in the presence of a magnetic field of flux 56, $\emptyset_m$ (s being the Laplace operator). This back-emf 60 sums (block 58) with the desired external voltage 32 $V_c$ applied to the voice-coil by the control circuit 50. The sum of the back-emf 60 and the applied external voltage 32 $V_c$ is applied across the electrical input impedance of the voice coil, $Z_{in}$ in block 62 to produce an input current, $I_{in}$. This input current, in the presence of the magnetic field of flux, $\emptyset_m$ develops a counter force on the actuator (hence $-\emptyset_m$ in block 64) which acts against the actuators mechanical impedance, $Z_{mo}$ in block 66 to produce electrically induced desired acceleration 46 $A_m$. This desired acceleration 46 $A_m$ sums (in block 52) with any external acceleration 44 $A_{in}$ to produce the total acceleration 42 $A_{tot}$ experienced by the actuator.

One embodiment of the invention is to tap the actuator current, such as measuring across a sense resistor, and filtering (W) it in block 72 by the function $W=Z_{in}(1+L)$ where $Z_{in}$ is the electrical input impedance of the voice-coil and L is the desired loop gain. Other methods of sensing the loop current, such as hall effect sensors, current mirrors, and multiple coils on the actuator, to name a few, exist and can be substituted by those of skill in the art and still meet the scope and spirit of the invention. The filtered $I_{in}$ is then subtracted from the applied voltage 32 to the coil and an error signal 70 E is created in block 76 that is proportional to the integral of the input acceleration and magnetic flux $$\left(e.g. \frac{A_{in}\Phi_m}{s}\right).$$

By passing this error signal 70 E through a filter H (block 74) with a response proportional to $$\frac{Z_{in}s}{Z_{mo}(s+p)},$$

where p is the selected low-pass roll-off frequency chosen to balance noise with shock attenuation, a signal is created, which when applied to the voltage across the actuator leads to an attenuation of the input shock and/or vibration.

For instance:

$$I_{in} = \frac{\frac{A_{in}\Phi_m}{sZ_{in}} + \frac{V_c}{Z_{in}}}{1+L}$$

$$A_{tot} = \frac{A_{in} - \frac{V_c\Phi_m Z_{mo}}{Z_{in}}}{1+L}$$

Objective: Minimize Atot

Let $W = Z_{in}(1+L)$ then $E = V_c - I_{in}W$ $$E = V_c - \frac{A_{in}\Phi_m}{s} - V_c$$

$$E = \frac{A_{in}\Phi_m}{s}$$

Let $H = \frac{Z_{in}s}{\Phi_m^2(s+p)Z_{mo}}$ then $$A_{tot} = \frac{A_{in} - \frac{EH\Phi_m Z_{mo}}{Z_{in}}}{1+L}$$

$$= \frac{A_{in} - \frac{A_{in}\Phi_m}{s} \cdot \frac{Z_{in}s}{Z_{mo}\Phi_m^2(s+p)} \cdot \frac{\Phi_m Z_{mo}}{Z_{in}}}{1+L}$$

$$= \frac{A_{in} - \frac{A_{in}}{s+p}}{1+L}$$

which means that the external accelerations $A_{in}$ will be substantially cancelled within a bandwidth below pole p.

Figure 4:
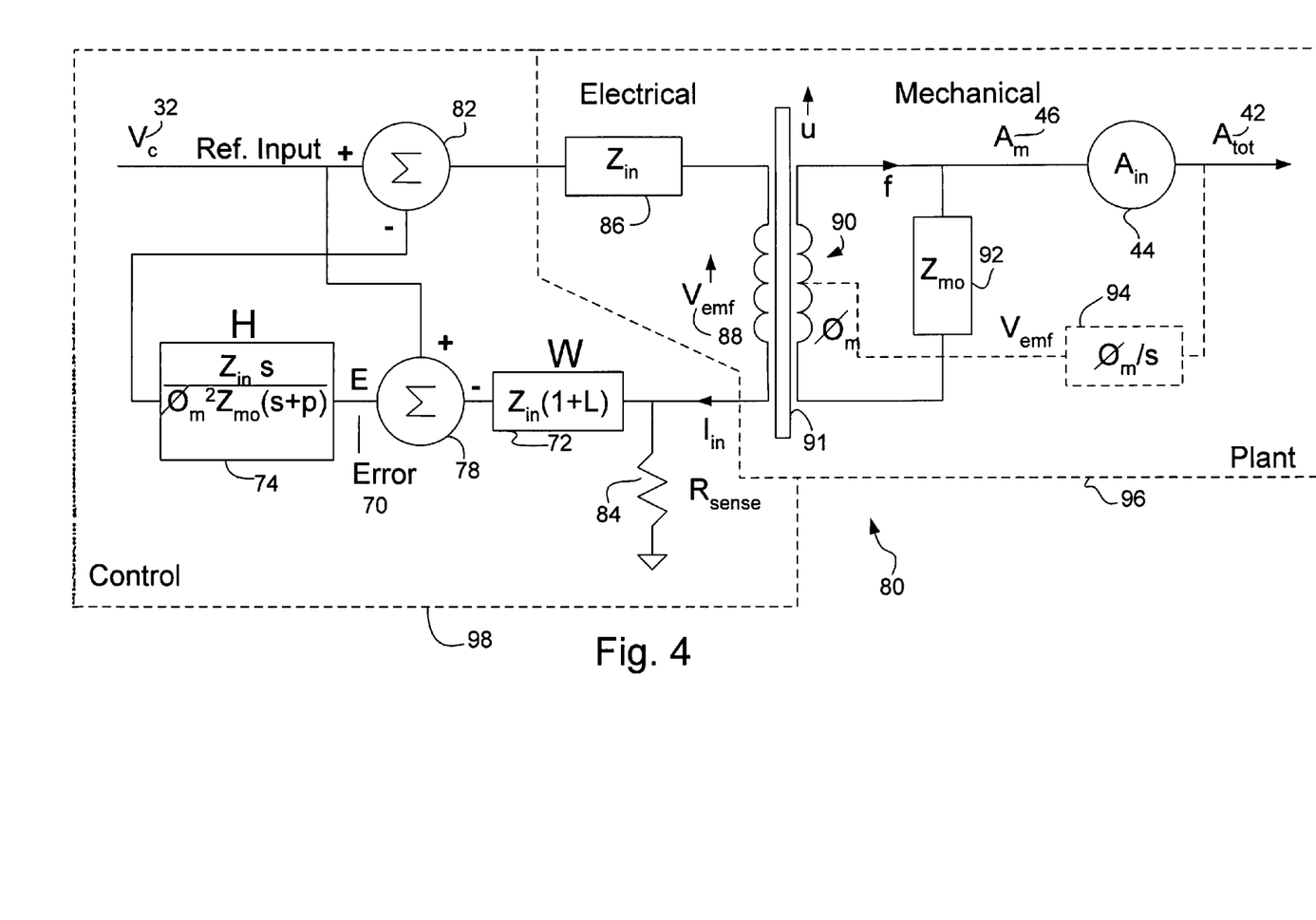
FIG. 4 is an alternative block control diagram of an exemplary embodiment of the invention.

FIG. 4 is a block diagram of an exemplary embodiment of a voice coil control system 80 that incorporates the above filters H and W. In this control system 80, the control portion 98 has the H filter 74, the W filter 72, and two difference blocks 82 and 78. The plant portion 96 of the control system 80 includes the electrical and mechanical portions of voice-coil 90 with characteristic input impedance 86 $Z_{in}$ and the characteristic mechanical impedance 92 $Z_{mo}$. The voice-coil 90 when applied a current operates on magnetic field $\varnothing_m$. The applied external reference voltage 32 $V_c$ has the filtered error signal subtracted in difference block 82 to create a voltage applied to the voice-coil 90. By virtue of the electrical impedance 86 $Z_{in}$ a current $I_{in}$ is generated through the voice-coil 90 and is sensed by a current sensor, sense resistor 84 $R_{sense}$. The voltage across the sense resistor 84 is filtered by the W filter 72 by the value of the input impedance of the voice coil times one plus the loop gain ($Z_{in}(1+L)$). This signal is the subtracted from the reference input 32 $V_c$ to create the error signal 70 E. The error signal 70 is filtered by the H filter to create the signal subtracted from the reference input 32 $V_c$. The H filter is proportional to the input impedance of the voice-coil and inversely proportional to the square of the magnetic flux and the mechanical impedance of the voice coil. The H filter includes a lead-lag component or circuit that has a zero at zero and a pole at p, a predetermined frequency chosen to trade-off shock and vibration resistance. The lead-lag component my include multiple poles and zeros which may also be programmable. The W and the H filters may be analog or digital based or a combination of each. Control system 80 may be implemented using a digital signal processor. The voice-coil 90 has an actuator 91 the moves through the magnetic flux $\varnothing_m$ with a velocity 'u' to create a force 'f' that acts against the mechanical impedance 92 $Z_{mo}$. This force on the mechanical impedance 92 creates a desired acceleration 46 $A_m$. External accelerations 44 $A_{in}$ are added to the desired acceleration 46 $A_m$ to create the total acceleration 42 $A_{tot}$ on the actuator 91. This $A_{tot}$ acceleration is effectively integrated (1/s) to create a velocity for the actuator 91 that moves in the magnetic flux $\varnothing_m$ to create the back-emf 88 $V_{emf}$ in block 94. This back-emf 88 is effectively subtracted from the applied voltage within the voice-coil 90 to reduce the input current $I_{in}$.

Figure 5:
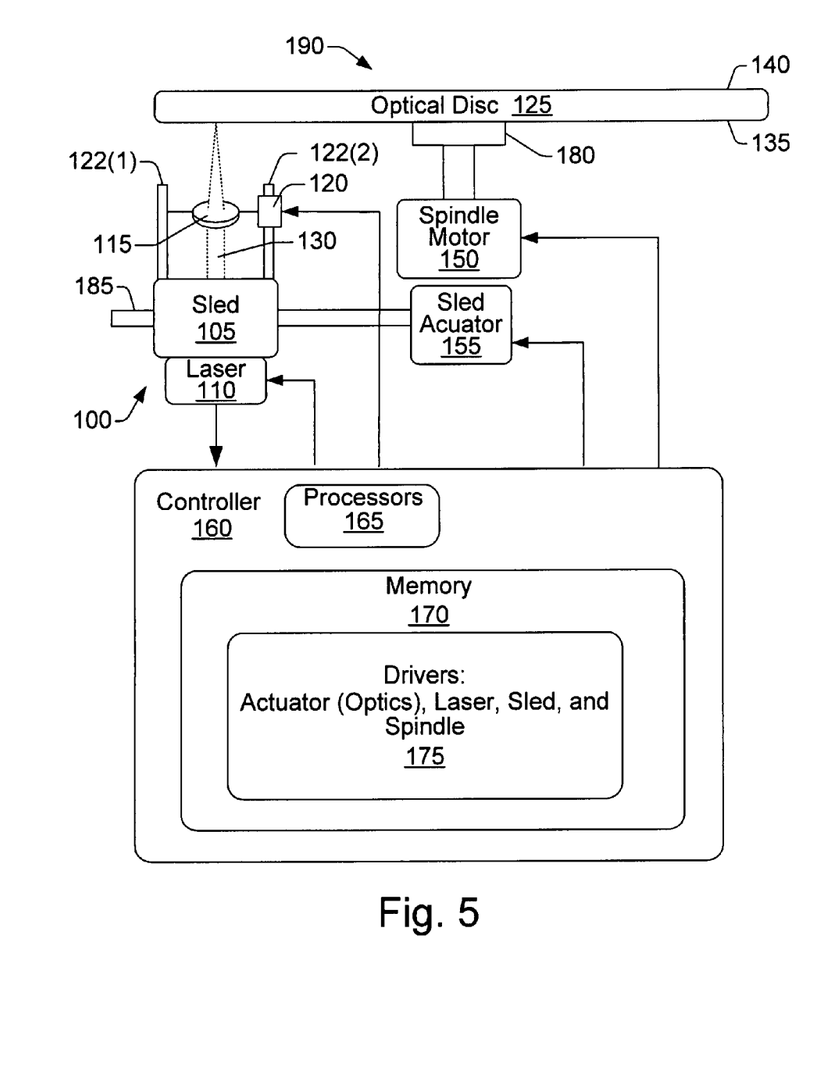
FIG. 5 is a block diagram of an optical drive system that incorporates at least one embodiment of the invention.

FIG. 5 is a block diagram of an optical drive system 190 that incorporates at least one embodiment of the invention. The optical drive system 190 includes a controller 160, an optical pick-up unit (OPU) 100, a spindle motor 150, and an optical disc 125. The controller 160 includes at least one processor 165, memory 170 and drivers 175 stored within the memory 170. The processor 165 may be a digital signal processor. The drivers 175 include software or firmware to control the actuator for the OPU, the laser, the sled actuator, and the spindle motor speed. Thus, one or more servo systems may be supported by the firmware. The OPU 100 includes at least one laser 110, a sled 105 which supports the laser, a focusing lens 115, and an focusing actuator 120 that moves on posts 122(1) and 122(2). The laser creates a beam of light 130 that is focused by the focusing lens 115 onto a surface of the optical disc 125. The OPU 100 is attached to a sled actuator 155 that radial positions the OPU 100 with respect to the optical disc 125 using a sled guide 185 that supports the sled 105 of the OPU 100. The spindle motor 150 is connected to a platen 180 that supports and hold the optical disc 125. The optical disc 135 has at least two surfaces, 135 and 140 used for reading or writing data and labels. Generally, one surface will be a data surface and the other surface will be a label surface. Optionally, the label and data surface may exist on both sides of the optical disc 125. Further, there may be additional surfaces buried within the optical disc that are accessible by the controller 160 through the use of laser 110 and focusing lens 115.

Of particular interest, when labeling one of the surfaces of the optical disc 125, there generally is not a spiral or concentric track that includes position information that the controller can access to determine the radial position, such as there is when using the data side of the drive. Thus, during labeling sessions, the controller 160 must position the OPU 100 using the sled actuator without any feedback from the optical disc 125 label surface. Unlike the data side of a disc, the surface of the label side generally does not have pit or wobbled surfaces that allow for feedback in the focusing servo implemented by the controller 160 and the OPU 100 focusing actuator 120. Thus, a labeling system is especially vulnerable to external shocks and vibrations that can result in miss-registration of the OPU 100 on the optical disc 125 surface. This mis-registration will result in visible special artifacts that are objectionable to users of the optical drive system 190. Thus, for an optical drive system, it is desirable that the self-sensing active damping voice coil be implemented at least for labeling the surface and optionally for reading and writing data to the data surfaces of the drive. Using the invention on the data side of the disc may allow for a reduction in the data buffers used, thus reducing cost and complexity. The self-sensing active-damping voice coil control can be applied to either the sled actuator 155 servo or the focusing actuator 120 servo or both. Because the mechanical impedance of the optical actuator may be different from that of the sled actuator, it is likely that different pole p's may be chosen for each servo system. In addition, because of the different electrical impedances of the two voice coils, the filters for each coil will have different constants as well. Thus, the controller 160 will implement one and perhaps two different servo control systems. Further, the H filter may have a lead-lag component that has one or more poles and the poles may be programmable.

Figure 6A:
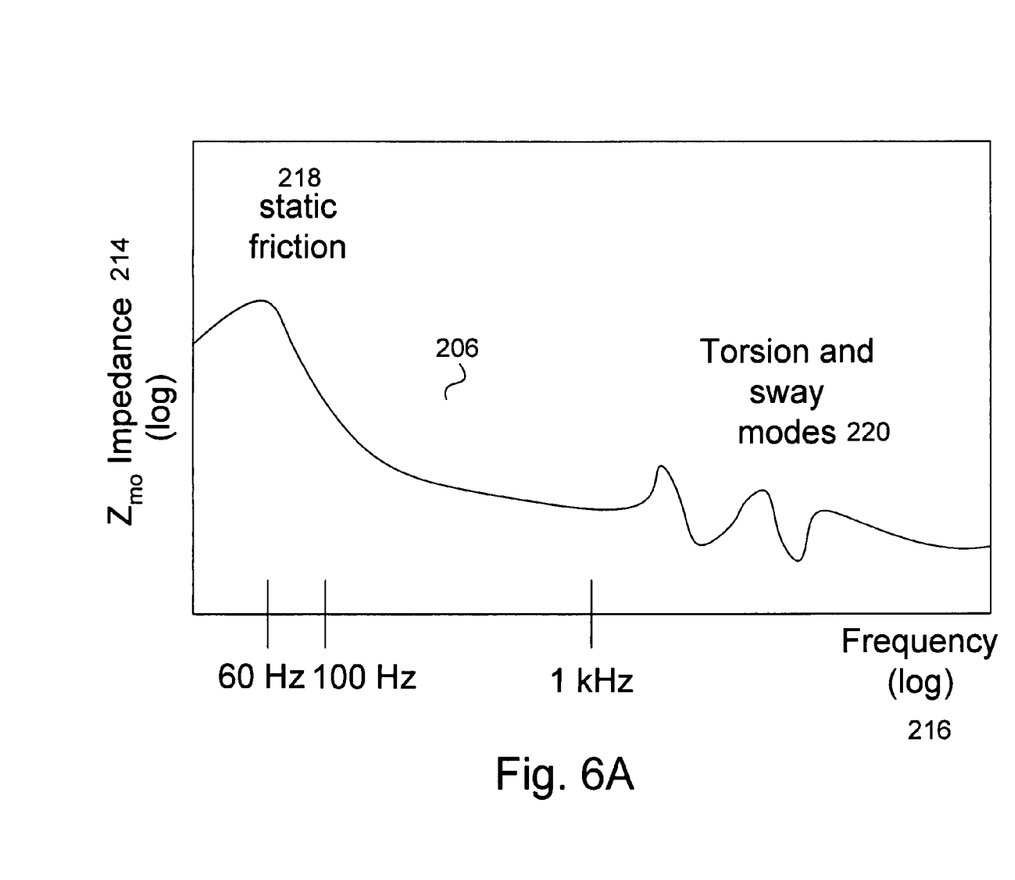
FIG. 6A is an exemplary chart showing the mechanical impedance modes of an actuator in one embodiment of the invention.
Figure 6B:
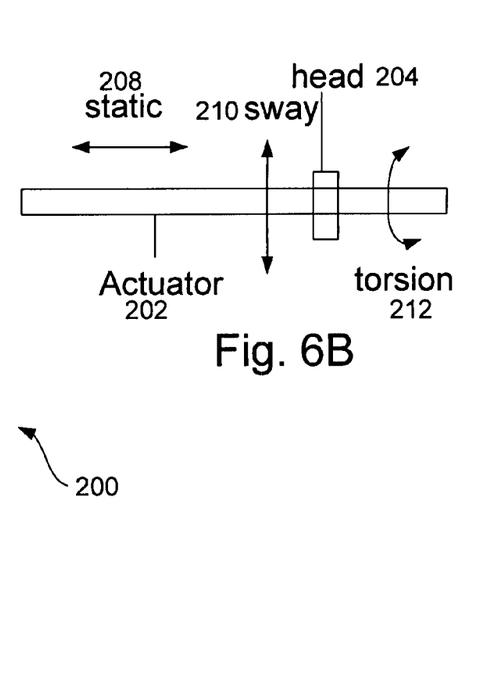
FIG. 6B is a schematic diagram of an actuator showing the various modes of mechanical motion leading to the mechanical impedance shown in FIG. 6A.

For reference only, FIGS. 6A and 6B are an mechanical impedance graph and schematic representation, respectively, of an exemplary actuator. In FIG. 6A, the mechanical impedance $Z_{mo}$ is plotted along the vertical axis 214 and the frequency is shown along the horizontal axis 216. In FIG. 6B, the actuator 202 is shown as a linear bar along which the head 204 moves back and forth. This back and forth movement has a static friction 208. In addition, the head 204 when moving or subject to shock and vibration may have a sway movement as shown by sway arrows 210. In addition, the head 204 may also rotate around the actuator 202 to create a torsion component 212. In FIG. 6A, the static friction 218 is generally within the low frequency range, such as below about 100 Hz, though there may also be a decreasing static friction 206 as the frequency increases. The torsion and sway modes 220 of the mechanical impedance $Z_{mo}$ are generally high frequency components such as shown above 1 kHz. This allows for the selection of the pole p to be place between 100 and 1 kHz to minimize shock and vibration while also allowing the actuator 202 to move the head 204 during seek operations. Alternatively, during seek operations, the loop can be opened or the pole changed to allow for the fastest seek respond then the loop closed and a lower pole frequency chosen to provide stronger shock and vibration rejection.

Depending on how an actuator is designed and used, its mechanical impedance may be different than that shown in FIG. 6A. For instance, one difference between focus/tracking actuators in optical drives and a hard disk actuator is that focus/tracking actuators are spring tethered so there is a region (up to about 60 Hz) where the position response to input current is a proportional displacement (flat line). At the resonance it peaks up and then after the resonance it goes to a $1/s^2$ type of fall off until reaching the structural resonances. In a hard drive, an actuator arm is not tethered so it has about $1/s^2$ fall off through the entire frequency range.

Figure 7A:
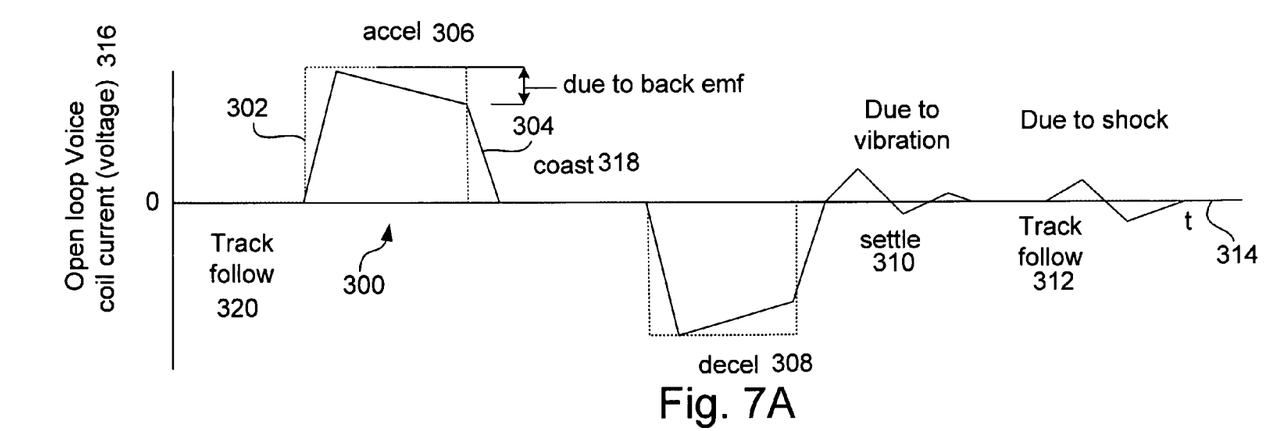
FIG. 7A is an exemplary timing chart illustrating the open loop voice coil current and voltage in one embodiment of the invention.
Figure 7B:
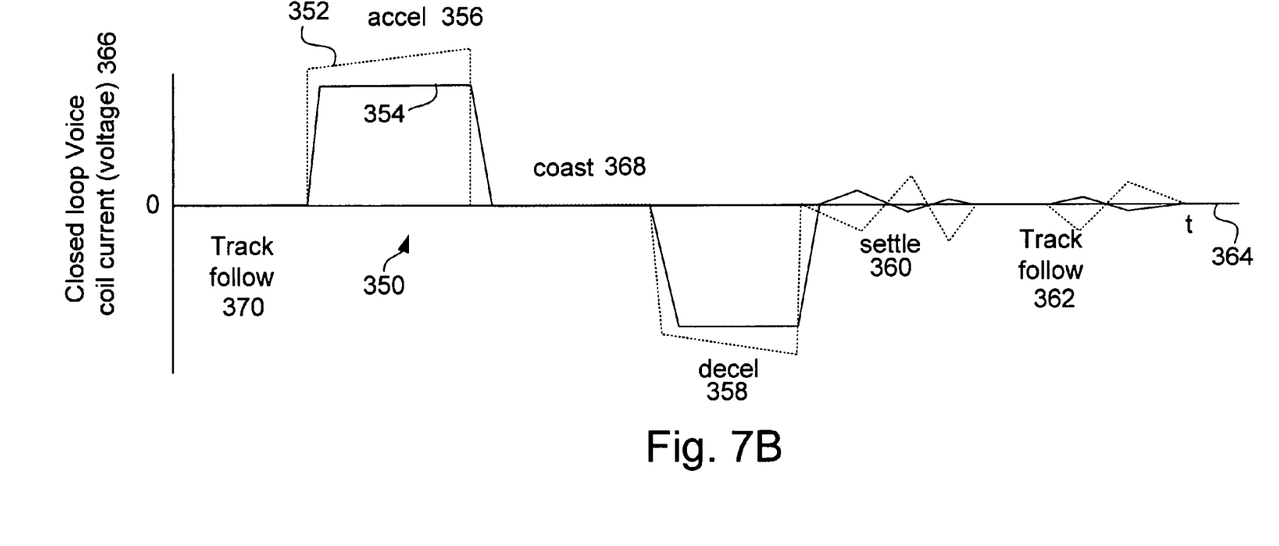
FIG. 7B is an exemplary timing chart illustrating the closed loop voice coil current and voltage in one embodiment of the invention.

FIGS. 7A and 7B are exemplary normalized open loop 300 and closed loop 350, respectively, voice-coil current (normalized voltage in dashed lines) graphs over time 314, 364 for various operations of the actuator. In FIG. 7A, the open loop voice coil current 316 is generally zero during track follow 320 operations. During acceleration 306 of the actuator, such as during a seek to a new track, a voltage 302 is applied to the coil. The current in the coil increases with time but as the actuator moves (and velocity increases) through the magnetic flux $Ø_m$ of the coil, the back-emf is generated causing the current in the coil to reduce, thus causing the actuator to slow. After the voltage to the coil is removed, the current 304 in the coil decreases back to zero and the head on the actuator coasts to its final position. To get the head to stop, a reverse voltage is applied to the coil during a decel time 308 which causes the coil current to flow in the opposite direction in the coil causing the actuator to have a force opposing the motion of the actuator and causing the head to slow. Once the decel time 308 is completed, the head slows and there is some vibration due to the final settling 310 before the track follow time 312. During the track follow time 312, external shock applied to the actuator/head creates a current in the voice coil. In the conventional open-loop system, this current is not sensed.

In FIG. 7B, the normalized closed loop voice-coil current 356 (normalized applied voice-coil voltage in dashed lines) are also zero during the track follow time 370. During a seek acceleration time 356, a voltage 352 is applied to the voice-coil. Because of the closed-loop operation, any current in the voice coil due to back-emf is sensed and compensated by the filter circuits such that the control circuit compensates the applied voice-coil voltage higher to substantially keep the voice-coil current 354 constant. Once the voice-coil voltage is removed, the current returns to zero and the actuator coasts 368 to the desired location. To stop the actuator, a decel period 358 is performed by applying a reverse voltage across the voice-coil to create an opposing force on the actuator to cause it to slow and stop. Because of the close-loop operation, when the actuator comes to a stop, any settling noise on the actuator/head causes a current to flow in the voice-coil that the control circuit senses and compensates accordingly. This compensation causes an opposing force on the actuator that tends to dampen the amount of settling movement of the actuator/head. In addition, during the track follow period 362, similarly, the control circuit compensates any shock and vibration that is externally applied to the actuator/head and thus the movement of the actuator/head is dampened. When labeling an optical disc, any visual artifacts are eliminated or substantially reduced. In one optional embodiment, the control system could be in open-loop configuration during the seeking operation to allow for a minimum seek time by allowing the full voltage of the driver to be applied to the coil. Once the actuator has seeked to a location, the control system can close the loop and minimize the movement of the actuator/head during the track/follow period. In another embodiment, the pole frequencies of the H filter can be changed appropriately during seek and track operations.

Figure 8:
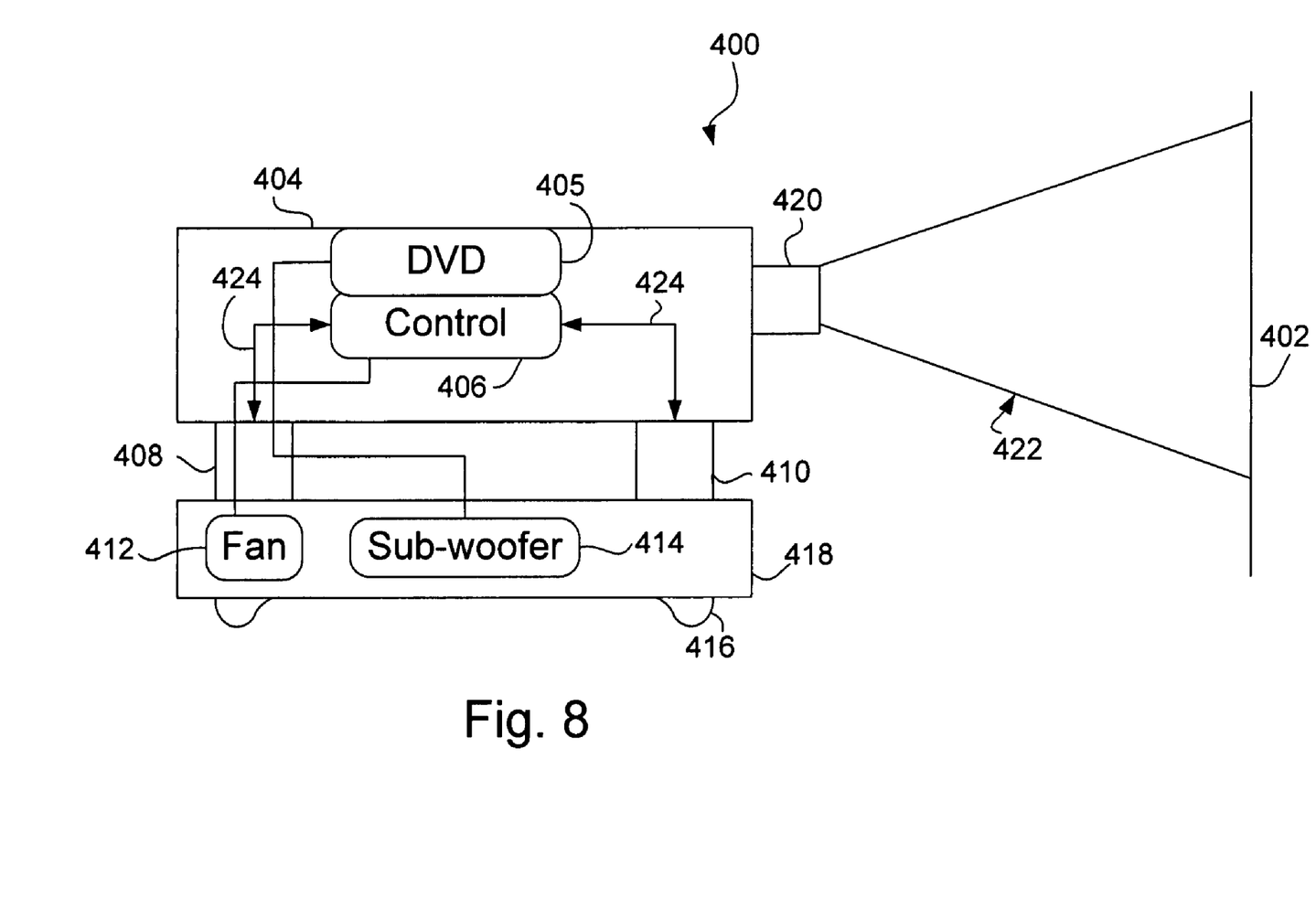
FIG. 8 is a block diagram of a projection system that incorporates at least one embodiment of the invention.

FIG. 8 is a block diagram of an embodiment of the invention in which the self-sensing active-damping voice-coil may be utilized in several locations. In this embodiment, an optical projector 400 includes an optical drive, a DVD player 405 that is connected to a control system 406. The DVD player 405 is further connected to a sub-woofer 414. The control system 406 is further connected to a fan 412 or other air moving device. The fan 412 and the sub-woofer 414 are known to make vibrational noise during operation. The DVD player 405 may include a servo circuits that include self-sensing active-damping voice coils on the drive and focus actuators. Even so, in a projector system 404, any additional movement or vibration caused by the fan 412 or sub-woofer 414 will cause movement of DVD player 405 causing skipping or movement of the projector system 404 and accordingly movement of the projected image 422 on the screen 402, which is undesirable. The projected image 422 is emitted from a projection lens 420. The projector may be a front projection system or incorporated into a rear projection system, such as a rear projection television or monitor. When the fan 412 and sub-woofer 414 are operating, it is desirable to limit the mechanical movement or vibrations caused by these devices from being received by the DVD player 405 and/or the projection system 404. In this embodiment, the projection system 404 is isolated from the lower assembly 418 by a pair of self-sensing active-damping voice coil isolation mounts 408 and 410. These mounts 408, 410 are controlled by the control system 406 thru circuits 424 to keep the motion of the projection system 404 steady. The lower assembly 418 may further include feet 416 that help isolated mechanical noise such as shock and vibration from outside of the projection system 404. Accordingly, the self-sensing active-damping voice coil actuators may be used in any application where reduction of mechanical noise from shock and vibration is desired.

Figure 9:
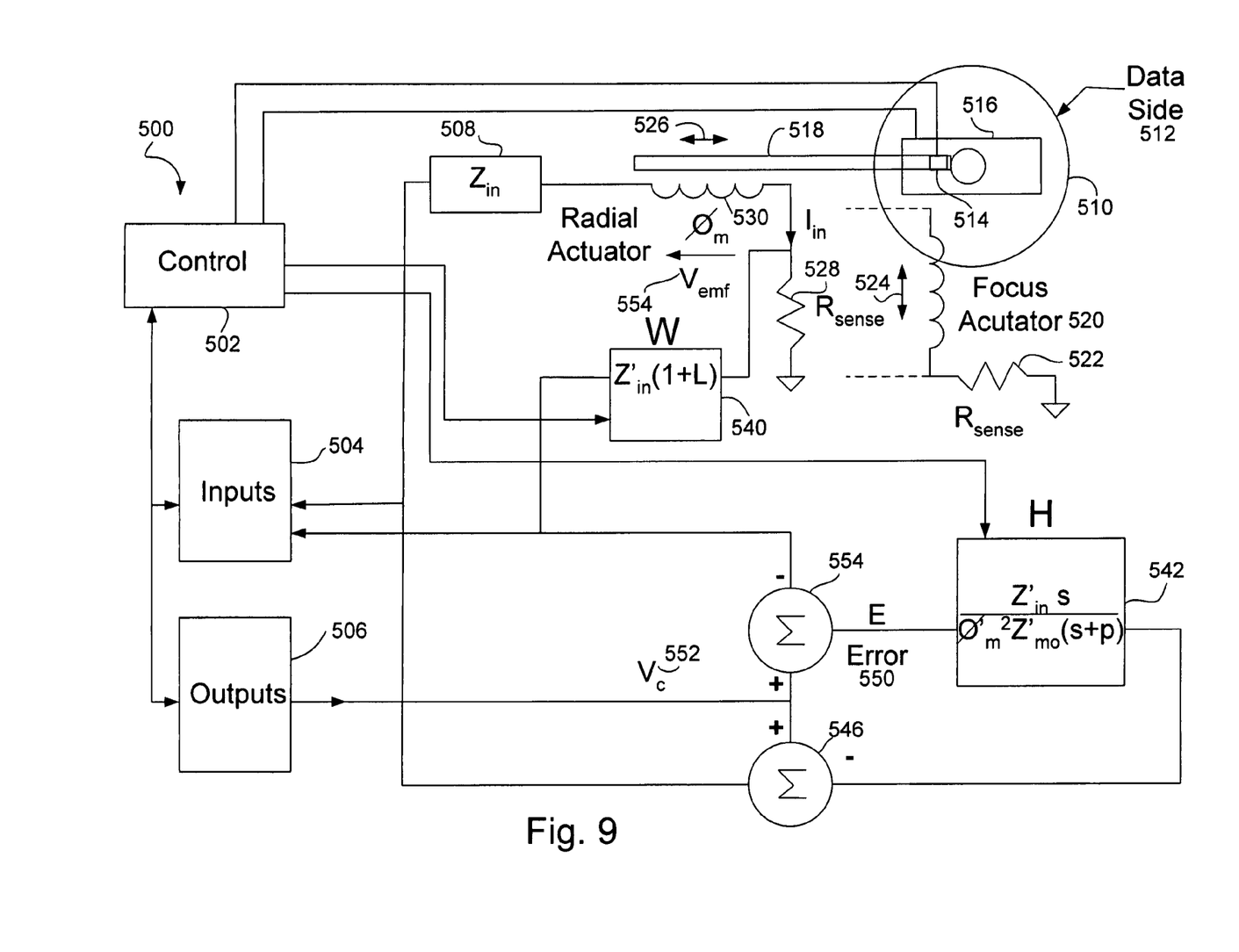
FIG. 9 is a schematic of a control system of one embodiment of the invention that allows for self-calibration of the control-loop filter coefficients.

FIG. 9 is a block diagram of an alternative embodiment of an optical drive 500 which uses circuitry to characterize the input impedance of the voice coil actuators to enable the proper programming of the filter coefficients for the W and H filters. In this embodiment, the W filter 540 and the H filter 542 are 'adaptive.' That is, the coefficients in the filters are programmable and thus can be changed.

The optical drive 500 includes a control circuit 502, a set of inputs 504 and a set of outputs 506 that are used by the control circuit 502 to detect or change the operation of the drive servo system. The control circuit 502 also has connections to the drive motor 516, the drive head 514, the W filter 540 and the H filter 542. The control circuit 502 may also implement the W filter 540 and the H filter 542 digitally. An optical disc 510 having a data side 512 is placed on the optical drive motor 516.

To calibrate what the electrical input impedance $Z_{in}$ of the radial seek actuator is, the control circuit selects an initial value for $Z'_{in}$ as a first guess and supplies a voltage $V_c$ 552 from output 506. For instance, $Z'_{in}$ can be represented as a finite impulse response (FIR) filter. The H filter is disabled at this time so the voltage $V_c$ 552 is applied to $Z_{in}$ 508 of voice coil 530. This creates a current $I_{in}$ that is indirectly proportional to $1/Z_{in}$ and which is sensed by the resistor $R_{sense}$ 528 creating a voltage that can be filtered to remove the $Z_{in}$ component if chosen properly such as with least-mean square (LMS) or other known algorithms. With LMS adaptive filtering, the FIR filter coefficients for $Z'_{in}$ are initialized by setting all weights to zero or an initial values. For a filter with i filter coefficients, the filter coefficients are updated using the relationship:

$$w_i(n+1)=w_i(n)+\mu^*e(n)^*x_i(n)$$

where $w_i(n)$ is the filter coefficient, e(n) is the error signal, $x_i(n)$ is the sensed voltage, and $\mu$ is the adaptation parameter or step size. Other digital filters, such as infinite impulse response (IIR), FFT (fast Fourier transform), DFT (discrete Fourier transform), or bilinear S to Z filters, just to name a few can be used and similarly their coefficients updated adaptively.

To calculate the H filter, it can be represented using a DFT filter to encompass the coefficients for $Z'_{in}$, $Z'_{mo}$ and $s/(s+p)$ factors. Alternatively, the $Z'_{in}$ FIR coefficients can be combined with recursive $Z'_{mo}$ coefficients and bilinear S to Z coefficients for the $s/(s+p)$ factors. Several other digital filter models may be used by those of skill in the art and still fall within the scope of the invention. Once a filter design in chosen, the control system 502 can adaptively select the coefficient values by supplying a voltage to the initial H filter 542 and allowing it to control the radial actuator 518 to selectively position the head 514 on disc 510. The control system 502 can supply power to the disc motor 516 to cause the disc 510 to rotate. The disc 510 has its data side surface 512 positioned next to the head 514 such that the control system 502 can read the track location from the data encoded in the data tracks. Thus, the control system 502 in response to supplying a voltage to the H filter 542 can read back head radial position. Accordingly, the filter coefficients can be adaptively updated to allow for a particular seek time/coil current/$Z'_{mo}$ combination. Since the control system 502 can control the coil current, and select a desired seek time, the mechanical impedance $Z'_{mo}$ can be determined.

Similarly as the filter coefficients for the respective W and H filters for the focus actuator 520 which moves in direction 524 with respect to the disc surface can be adaptively compensated for by using its respective current sense, sense resistor 522 which is connected to the control system 502.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A control circuit for a self-sensing active-damping voice coil, comprising:
   a current sensor coupled to the voice coil;
   a first filter coupled to the current sensor to create an error voltage proportional to the integral of an external acceleration applied to the voice coil; and
   a second filter with a lead-lag component having more than one pole coupled to the error voltage to create a voltage applied to the voice coil that substantially cancels the external acceleration below a pole defined by the lead-lag component.

2. The control circuit of claim 1, wherein the second filter has a response proportional to a product of a ratio of electrical to mechanical impedances of the voice coil and the lead-lag component.

3. The control circuit of claim 1, wherein the lead-lag component has at least one programmable pole.

4. The control circuit of claim 1 wherein the current sensor is a resistor.

5. The control circuit of claim 1 wherein at least one of the first and second filters is an analog circuit.

6. The control circuit of claim 1 wherein at least one of the first and second filters is a digital circuit.

7. The control circuit of claim 1 wherein at least one of the first or second filters is performed in a digital signal processor.

8. The control circuit of claim 1 wherein at least one of the first and second filters is adaptive.

9. The control circuit of claim 1 wherein the second filter is removable during a seek operation.

10. A control circuit for a voice coil, comprising:
    means for sensing-current through the voice coil;
    means for filtering the sensed current to create an error voltage proportional to the integral of an external acceleration applied to the voice coil; and
    means for filtering the error voltage with a response proportional to a product of a ratio of electrical to mechanical impedances of the voice coil and a lead-lag circuit having more than one pole to create a voltage applied to the voice coil that substantially cancels the external acceleration below a pole defined by the lead-lag circuit.

11. A voice coil actuator, comprising:
    an electromagnet; and
    a control circuit including,
       a current sensor coupled to the electromagnet;
       a first filter coupled to the current sensor to create an error voltage proportional to the integral of an external acceleration applied to the electromagnet; and
       a second filter with a lead-lag component having more than one pole coupled to the error voltage to create a voltage applied to the electromagnet that substantially cancels the external acceleration below a pole defined by a lead-lag component.

12. The voice coil actuator of claim 11 wherein the second filter has a response proportional to a product of a ratio of electrical to mechanical impedances of the electromagnet and the lead-tag component.

13. The voice coil actuator of claim 12 wherein at least one of the first and second filters is adaptive.

14. The voice coil actuator of claim 12 wherein at least one of the first or second filters is performed in a digital signal processor.

15. A voice coil actuator, comprising:
    an electromagnet; and
    a control circuit including,
       means for sensing current through the electromagnet;
       means for filtering the sensed current to create an error voltage proportional to the integral of an external acceleration applied to the electromagnet; and
       means for filtering the error voltage with a response proportional to a product of a ratio of electrical to mechanical impedances of the electro-magnet and a lead-lag circuit having more than one pole to create a voltage applied to the electromagnet that substantially cancels the external acceleration below a pole defined by the lead-lag circuit.

16. A method for reducing external accelerations from a voice coil actuator, comprising:
    sensing current through the voice coil;
    filtering the sensed current to create an error voltage proportional to the integral of an external acceleration applied to the voice coil; and
    filtering the error voltage with a response proportional to a product of a ratio of electrical to mechanical impedances of the voice coil and a lead-lag circuit having more than one pole to create a voltage applied to the voice coil that substantially cancels the external acceleration below a pole defined by the lead-lag circuit.

17. The method of claim 16 further comprising adaptively setting filter coefficients.

18. The method of claim 17 wherein the step of adaptively setting filter coefficients further comprises reading the position of the voice coil actuator with respect to a disc surface.

19. A memory drive, comprising:
    a disc;
    a motor coupled to the disc;
    an actuator;

a head attached to the actuator, the head positioned to couple to the disc; and a controller for controlling the motor, the actuator and interfacing to the head, the controller having at least one servo system for controlling the actuator, the servo system including, a current sensor coupled to the actuator;

a first filter coupled to the current sensor to create an error voltage proportional to the integral of an external acceleration applied to the actuator; and a second filter with a lead-lag component having more than one pole coupled to the error voltage to create a voltage applied to the actuator that substantially cancels the external acceleration below a pole defined by a lead-lag component.

20. The memory drive of claim 19, wherein the second filter has a response proportional to a product of a ratio of electrical to mechanical impedances of the actuator and the lead-lag component.

21. The memory drive of claim 19 wherein the head includes a laser.

22. The memory drive of claim 19 wherein the controller includes a digital signal processor.

23. The memory drive of claim 19 wherein at least one of the first and second filters is adaptive.

24. A drive, comprising:

a disc;

a motor coupled to the disc;

an actuator;

a head attached to the actuator, the head positioned to couple to the disc; and a controller for controlling the motor, the actuator and interfacing to the head, the controller having at least one servo system for controlling the actuator, the servo system including, means for sensing current through the actuator;

means for filtering the sensed current to create an error voltage proportional to the integral of an external acceleration applied to the actuator; and means for filtering the error voltage with a response proportional to a product of a ratio of electrical to mechanical impedances of the actuator and a lead-lag circuit having more than one pole to create a voltage applied to the actuator that substantially cancels the external acceleration below a pole defined by the lead-lag circuit.

25. A method of using a voice coil as a self-sensing detector for active-damping of external accelerations, comprising:

applying a voltage to the voice coil;

sensing the current in the voice coil;

filtering the sensed current and subtracting the filtered value from the applied voltage to create an error signal proportional to the integral of the external acceleration;

filtering the error signal to create an output signal proportional to a product of a ratio of electrical impedance to the mechanical impedance of the voice coil and a lead-lag filter having more than one pole and having at least one pole chosen to attenuate the noise and shock of the external accelerations.

26. The method of claim 25, further comprising adaptively setting the filter coefficients for filtering the sensed current.

27. The method of claim 25, further comprising adaptively setting the filter coefficients for filtering the error signal.

28. The method of claim 27 wherein the voice coil is used to set the radial position of a head on a disc drive, further comprising:

reading the location of the head with respect to a disc surface from a track on the disc surface; and calculating the adaptively set filter coefficients based on the read location.

29. A method of characterizing the mechanical impedance of a drive actuator on a drive having a data surface and a head for reading the data surface, comprising the steps of:

applying a current to the drive actuator to move the head with respect to the data surface;

reading the location of the head with respect to a data surface from the data surface;

choosing a desired seek time;

calculating mechanical impedance based on the read location, the desired seek time and the applied current.

30. A control circuit for compensating for back-emf in a solenoid, comprising:

a sensor configured to detect current in the solenoid when subjected to external accelerations;

a first filter to convert the detected current to an error signal proportional to the integral of the external accelerations; and a lead-lag second filter having more than one pole accept the error signal and to apply energy to the solenoid proportional to a product of a ratio of electrical impedance to the mechanical impedance of the solenoid and the lead-lag second filter having a pole chosen to attenuate the noise and shock of the external accelerations to substantially cancel the back-emf caused by the external accelerations within a limited frequency range less than the pole.

31. The control circuit of claim 30 further comprising logic to adaptively detect the electrical impedance of the solenoid.

32. The control circuit of claim 30 further comprising logic to adaptively detect the mechanical impedance of the solenoid.

* * * * *

UNITED STATES PATENT AND TRADEMARK OFFICE
CERTIFICATE OF CORRECTION

| | | |
|---|---|---|
| PATENT NO. | : 7,633,839 B2 | Page 1 of 1 |
| APPLICATION NO. | : 10/923524 | |
| DATED | : December 15, 2009 | |
| INVENTOR(S) | : Hanks | |

It is certified that error appears in the above-identified patent and that said Letters Patent is hereby corrected as shown below:

In column 10, line 2, in Claim 10, delete "sensing-current" and insert -- sensing current --, therefor.

In column 10, line 27, in Claim 12, delete "lead-tag" and insert -- lead-lag --, therefor.

In column 12, line 38, in Claim 30, delete "pole accept" and insert -- pole to accept --, therefor.

Signed and Sealed this
Eleventh Day of January, 2011

David J. Kappos
*Director of the United States Patent and Trademark Office*